Sept. 18, 1962     W. R. GRAHAM, JR., ET AL     3,054,677

METHOD OF MAKING SHREDDED CEREAL PRODUCT

Filed June 26, 1959

INVENTORS
WILLIAM R. GRAHAM, JR. &
BENJAMIN GROGG
BY

ATTORNEYS

United States Patent Office 3,054,677
Patented Sept. 18, 1962

3,054,677
METHOD OF MAKING SHREDDED CEREAL PRODUCT
William R. Graham, Jr., Northfield, and Benjamin Grogg, Arlington Heights, Ill., assignors to The Quaker Oats Company, Chicago, Ill., a corporation of New Jersey
Filed June 26, 1959, Ser. No. 823,167
5 Claims. (Cl. 99—82)

This invention relates generally to the production of a shredded, ready-to-eat, dry cereal food product, and more particularly to the production of a small shredded cereal biscuit which may be termed bite-size.

A modern dry, ready-to-eat cereal product should have an attractively palatable appearance, and a shredded bite-size product has strong sales appear to the average consumer. Such a product should be light in weight, crisp and frangible, and highly moisture-absorbent when eaten with milk. The product preferably has a light brown toasted appearance suggesting a pleasing taste, and the flavor is usually enhanced by additions of sweetening and seasoning ingredients. The shredding of cereal products in the course of preparation accelerates and improves the uniformity of their cooking and toasting time.

Since the advent of the well-known shredded wheat biscuit, many variations of shredded cereal food products have been proposed, but in practically all cases the shredding has been accomplished by passing the cooked cereal or cereal dough between rolls, at least one of which is grooved to produce shreds of dough which are later baked or toasted to make them crisp and dry. Where a plurality of superimposed layers is desired, a separate pair of shredding rolls is required for each layer. These shredding rolls are expensive to make and to maintain, and a substantial amount of conveying equipment is required to carry the material to and from the shredding rolls.

The objects of the present invention include the provision of a novel shredded bite-size cereal product having a unique texture and pleasing taste.

Another object is to provide a novel, shredded, dry oat cereal product which does not become rancid when stored, and which has high crispness and moisture-absorbency.

A further object is to provide a novel and improved method of producing a shredded dry cereal product without the use of shredding rolls.

A still further object is to provide an improved and economical method of producing an improved shredded dry cereal product with a minimum amount of floor space, machinery and personnel.

These and other objects are accomplished by the novel and improved method and product comprising the invention, preferred embodiments of which are illustrated by way of example in the accompanying drawing, and described in detail herein. Various modifications and changes in details may be made in the process and product within the scope of the claims appended hereto.

According to the present improved process, an oat cereal dough of desired formulation is kneaded, worked and cooked while passing through an extruder-heat exchanger of conventional design, from which it is extruded through a die having a preferably circular arrangement of closely adjacent orifices discharging a cylindrical arrangement of dough strands. The strands enlarge or expand into contact with each other as they issue from the die and the extruded cylinder or tube of strands is then passed progressively through a pair of cutting rolls which pinch off sections or pillow-shaped pieces of the tube, the pieces being immediately passed through a hot air stream and then baked.

Referring to the drawing herein:

In carrying out the improved process to produce a novel bite-size shredded product, consisting principally of oat cereal, an oat base mix is prepared composed of oat flour with small amounts of sweetening, seasoning, stabilizing, enriching and coloring ingredients. The mix may be blended dry and then have water added or water may be added simultaneously with the mixing. In either event, sufficient water is added to adjust the moisture content of the mixture to 27%–35%, and preferably about 31%. The method of mixing and adjusting the moisture content per se forms no part of the present invention.

The moist mixture is then introduced into a continuous heat exchanger, preferably in the form of a screw extruder of conventional construction. During the passage of the mixture through the extruder, which requires from 25 to 60 seconds, the temperature of the mixture is maintained at about 250° to 330° F. and the starch in the mixture is gelatinized while the dough is cooked and transformed into a rubber-like mass. In applying the improved process to other cereals, it is necessary to vary the range of temperatures maintained in the extruder. The extrusion temperature for rice should be from about 200° to about 240° F., for corn about 200° to about 250° F., and for wheat about 210° to about 270° F.

Figure 1:
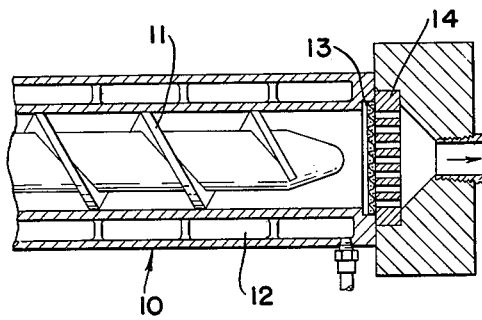
FIG. 1 is a schematic view showing apparatus for carrying out the improved process.
Figure 2:
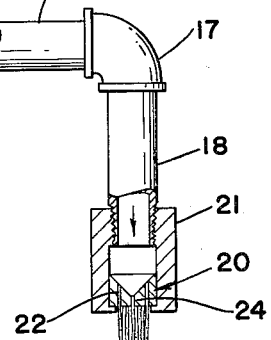
FIG. 2 is an enlarged cross sectional view of a preferred form of extruding die.

In FIG. 1, the discharge end portion of the extruder is shown at 10. The rotating screw conveyor 11 is enclosed within a jacket 12 through which a heating medium such as steam is circulated. The screw 11 preferably has a compression ratio of about 3 or 4 to 1, and the compression of the moist cereal mixture increases the heat transferred to the mixture, and subjects the dough being formed to vigorous working and high rates of shear.

At the exit end of the extruder, a screen pack 13 of one or more 40-mesh screens may be provided for preventing foreign material or non-plasticized material from passing to the extrusion die, and for increasing back pressure in the extruder. Also, a breaker plate 14 having a plurality of holes about ⅛" in diameter may be mounted behind the screen pack 13 to increase the shearing action and further increase the back pressure. The use of a screen pack and breaker plate at the exit end of an extruder for plastic material is well known.

The dough is forced by the screw through the screen pack and breaker plate into a horizontal pipe 16, and thence through an elbow 17 and vertical pipe 18, at the bottom of which is mounted an extruding die 20, through which the dough is extruded in a vertically downward direction. Heat may be applied to the pipes 16 and 18 by any suitable means, to maintain the dough therein at a desired temperature.

Figure 3:
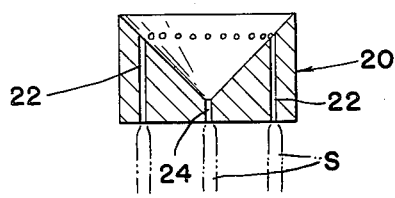
FIG. 3 is an end elevation thereof.

As shown, the extruding die 20 may be removably mounted in the lower end of a cylindrical sleeve or housing 21, the upper end of which is screwed on the bottom end of the pipe 18. As shown in FIG. 3, the extruding orifices 22 are arranged in a circle about the axis of the die, and the orifices are closely adjacent to each other. The diameter of the orifices 22 may be of the order of from .025" to .040". The orifices are spaced apart approximately .10" to .13". The relation of the diameter of the orifices to their land lengths (the axial length of the orifices) is important in controlling the amount of expansion of the dough as it is extruded from the orifices, and the amount of expansion is reflected in the appearance and texture of the final product P in the form of blisters 23 on the surface of the strands.

Generally speaking, the greater the land length of the orifice the more the strand of dough will be expanded to form air cells therein as it is extruded and the internal pressure is released. We have found that ratios of orifice diameter to land length of from 1 to 5 to 1 to 15 may be used with good results. However, while the final product made with a 1 to 15 orifice to land ratio has greater expansion of the strands or shreds and slightly more crispness than when extruded through orifices having a 1 to 5 ratio, the latter produces a more uniform product in respect to the texture of the individual strands, and the symmetry of the individual biscuits. The preferred ratio is 1 to 10 orifice diameter to land length, as this provides a happy medium in respect to these desirable properties.

The dough is extruded from the die 20 in the form of a closed ring of strands or shreds S flowing continuously downward to preferably form a cylinder or tube. While the orifices 22 are shown arranged in a circle, they may be otherwise arranged, as for example in the form of an oval or a rectangle, and various other such closed path configurations. In all arrangements, the spacing of the orifices 22 is such that when the strands issue therefrom and the expansion due to sudden release of pressure takes place, the adjacent strands contact each other transversely of the tube and become bonded or fused together laterally at intermittent or random places, throughout the length of the tube. As shown, the extrusion die 20 may have an axial orifice 24 therein of substantially the same diameter as the outer orifices 22, but the land length of the orifice 24 is substantially reduced to increase the extrusion speed of the strand of dough issuing therefrom. The result is that the center strand becomes wavy or crinkled within the hollow tube formed by the other substantially straight strands.

The tube of downwardly flowing, partially contiguous strands S passes through a cutting off device which may be a pair of rolls, indicated at 27 and 28, the roll 27 being a smooth anvil roll, and the roll 28 having radially extending knives 29 spaced apart circumferentially a distance equal to the desired length of the cut off pieces. As the tube of extruded strands passes between the rolls 27 and 28, the knives 29 pinch off segments or pieces of predetermined length, and the cutting operation compresses the ends of the pieces into substantially flat sealed or fused edges, thus forming pieces 30 of generally pillow shape. The pillow-shaped pieces 30 drop or are blown into a conduit 31 in which they are conducted in about 1 to 3 seconds by a rapidly moving stream of hot air entering from pipe 32 at a temperature of about 450° F. to 525° F. into a cyclone separator 33, from which they are discharged onto a conveyor 34 which passes them through a conventional drying oven (not shown) in 1½ to 2 minutes, in which a temperature of about 350° to 400° F. may be maintained for final drying and toasting of the product.

The lateral bonding or fusing together at intermittent random points of adjacent strands or shreds as they are extruded from the die 20 facilitates holding the strands together as they pass from the die 20 to the cutting rolls, and aids in maintaining the pillow-shaped biscuits intact as they pass from the cutting rolls through the hot air stream and cyclone separator. However, the non-fused spaces between the strands and at the sides of each biscuit between the two fused ends allows very thorough circulation of the hot air around all the strands with the result that the strands are substantially instantaneously heated throughout, causing further expansion and blistering of the air cells in the shreds and improving the crispness of the product.

Figure 5:
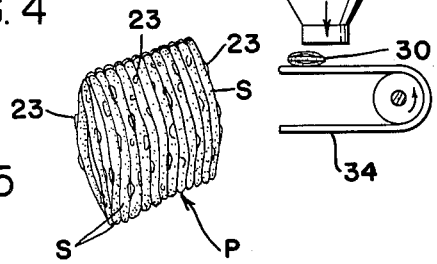
FIG. 5 is a perspective view of a preferred form of the final product.

In the final product P the individual strands have a plurality of blisters 23 or open air cells, as indicated in FIG. 5. These contribute substantially to the crispness and texture of the product, which in the case of an oat cereal has a greater crispness and porosity than has heretofore been attainable. Moreover, because of the rapid heating of the pillow-shaped pieces of the extruded material at relatively high temperatures the capability of storing the product over long periods of time without becoming rancid is believed to be improved.

Figure 4:
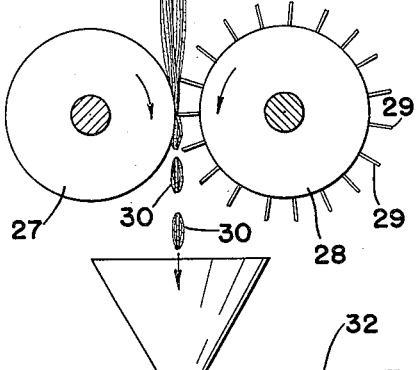
FIG. 4 is an enlarged cross sectional view of a modified form of extruding die.
Figure 4:
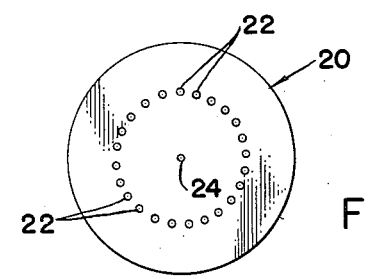

The modified extrusion die 120 shown in FIG. 4 has a circular arrangement of orifices 122 which have diameters in the same size range as orifices 22 and are spaced apart the same distances. The ratio of orifice diameter to land length may vary over the same range of from 1 to 5 to 1 to 15, and the land length of orifices 122 is shown somewhat less than that of orifices 22. The die 120 has no center or axial orifice and the interior die surface within the orifices 122 is preferably formed as a rearwardly or upwardly extending cone.

The circular arrangement of orifices 22 and 122 may consist of about 24 orifices equally spaced around a circle of about ¾ inch diameter. When the tube of strands extruded from such dies is cut off by dies 27 and 28 into pieces about ¾ inch in length, bite-size pieces roughly ¾ inch square are produced.

The novel method provides for continuous extruding of a tube of cooked strands or shreds which are immediately pinched off into bite-size pieces, and dried and toasted without multiple handling and conveying as is required in using shredding rolls. The amount of apparatus and number of processing operations is substantially reduced and the extrusion dies are inexpensive to make and easily changed.

The novel product has a unique blistered and palatable appearance, is exceptionally crisp and moisture-absorbent, and can be stored for substantial periods without becoming rancid.

What is claimed is:

1. A method of making a shredded, ready-to-eat, dry cereal product, comprising the steps of continuously extruding strands of cooked cereal dough through a series of closely adjacent orifices arranged in a closed path with the extrusion temperature of said dough being from 200° to 330° F. whereby the extruded strands will expand into contact with each other as said strands issue from said orifices, pinching off sections of said expanded strands to form hollow pillow-shaped pieces, and additionally heating said pieces to blister and set said strands.

2. A method of making a shredded, ready-to-eat, dry cereal product, comprising the steps of, continuously extruding strands of cooked cereal dough through a series of circularly arranged closely adjacent orifices with the extrusion temperature of said dough being from 200° to 330° F. whereby the extruded strands will expand into contact with each other as said strands issue from said orifices, pinching off sections of said expanded strands to form hollow pillow-shaped pieces, and additionally heating said pieces by exposure to hot air at a temperature sufficient to blister and set the strands.

3. A method of making a shredded, ready-to-eat, dry cereal product, comprising the steps of, continuously extruding strands of cooked cereal dough through a series of tubularly arranged closely adjacent orifices with the extrusion temperature of said dough being from 200° to 330° F. whereby the extruded strands will expand into contact with each other immediately after said issue, pinching off sections of said expanded and contacting strands to form hollow-shaped pieces, and additionally heating said pieces by exposure to an air blast having a temperature of from 450° to 525° F.

4. A method of making a shredded, ready-to-eat, dry cereal product, comprising the steps of, continuously extruding stands of cooked cereal dough through a series of tubularly arranged closely adjacent orifices with the extrusion temperature of said dough being from 200° to 330° F. whereby the extruded strands will expand into contact with each other immediately after said issue, pinching off sections of said expanded and contacting strands to form hollow-shaped pieces, additionally heating said pieces by exposure to an air blast having a temperature of from 450° to 525° F., and finally passing said heated pieces through a drying oven maintained at a temperature of about 350° to 400° F. in a time period of from 1½ to 2 minutes.

5. A method of making a shredded, ready-to-eat, dry cereal product the cereal content of which is wholly oats, comprising, rapidly cooking and simultaneously working an oat flour dough having a moisture content of from 27% to 35%, continuously extruding strands of cooked cereal dough through a series of circularly arranged closely adjacent orifices with the extrusion temperature of said dough being from 200° to 330° F. whereby the extruded strands will expand into contact with each other immediately after said issue, pinching off sections of said expanded and contacting strands to form hollow-shaped pieces, additionally heating said pieces by exposure to an air blast having a temperature of from 450° to 525° F., and finally passing said heated pieces through a drying oven maintained at a temperature of about 350° to 400° F. in a time period of from 1½ to 2 minutes.

References Cited in the file of this patent
UNITED STATES PATENTS

| | | |
|---|---|---|
| 1,924,826 | Anderson | Aug. 29, 1933 |
| 2,036,681 | Campbell | Apr. 7, 1936 |
| 2,338,588 | Kishlar et al. | Jan. 4, 1944 |
| 2,600,532 | Hale et al. | June 17, 1952 |
| 2,743,685 | Hale et al. | May 1, 1956 |
| 2,858,219 | Benson | Oct. 28, 1958 |